Dec. 15, 1964 K. W. CATTERMOLE 3,161,828

COMMUNICATION SYSTEM EMPLOYING PHASE SHIFTERS AND QUANTIZERS TO REDUCE NOISE

Filed Oct. 31, 1961 2 Sheets-Sheet 1

Inventor
Kenneth W. Cattermole
By [signature]
Attorney

Dec. 15, 1964 K. W. CATTERMOLE 3,161,828

COMMUNICATION SYSTEM EMPLOYING PHASE SHIFTERS AND QUANTIZERS TO REDUCE NOISE

Filed Oct. 31, 1961 2 Sheets-Sheet 2

Inventor
Kenneth W. Cattermole

By [signature]
Attorney

United States Patent Office 3,161,828

Patented Dec. 15, 1964

3,161,828

COMMUNICATION SYSTEM EMPLOYING PHASE SHIFTERS AND QUANTIZERS TO REDUCE NOISE

Kenneth W. Cattermole, London, England, assignor to International Standard Electric Corporation, New York, N.Y., a corporation of Delaware Filed Oct. 31, 1961, Ser. No. 148,966
Claims priority, application Great Britain, Nov. 16, 1960, 39,385/60
20 Claims. (Cl. 325—42)

Figure 1:
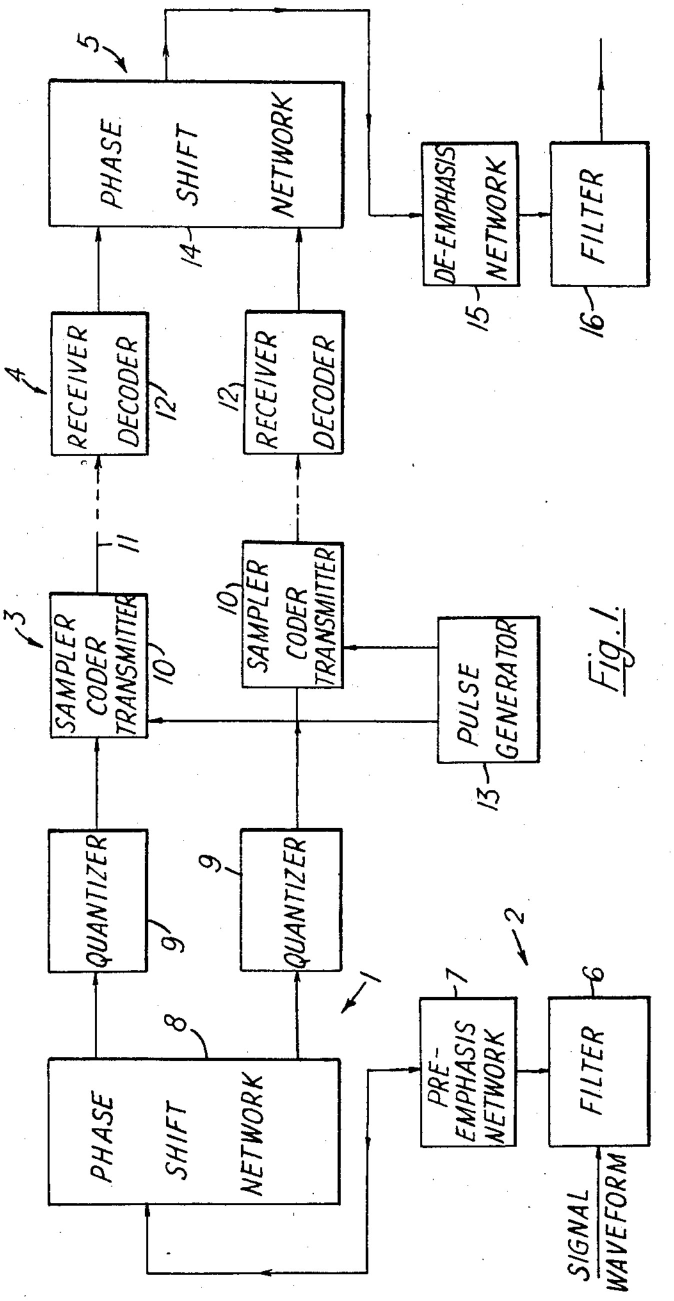

This invention relates to signal transmission systems and more particularly to signal transmission systems, such as telephone systems, where a speech or other signal waveform is quantized and coded and transmitted by means of pulse modulation.

It is an object of the present invention to provide a signal transmission system in which the unwanted noise is reduced. If a periodic waveform is quantized, the result contains all the odd harmonics, which constitute noise. In general, the $(4n-1)$th harmonics constitute a larger portion of the noise power than the $(4n+1)$th harmonics. Thus, if the $(4n-1)$th harmonics can be reduced or eliminated a great improvement in the quality of the transmitted and decoded signal can be obtained.

A periodic signal waveform can be applied to two phase shift networks having common input terminals and distinct output terminals, so designed that the power spectra of the two output signal waveforms are alike but disposed in quadrature phase relationship with respect to each other. The two quadrature signal waveforms have the property that, in general, their zero crossings are distinct, and their stationary points are distinct. Roughly speaking, when one is stationary the other is moving.

The information contained in a quantized signal waveform is contained in its transitions; with two level quantizing, in zero crossings. In the vicinity of a stationary point of the original signal waveform all fine detail may be lost in quantizing. These considerations suggest that if two quadrature signal waveforms, such as are described above, are separately quantized the information contained in the resulting signal waveforms is largely independent.

In a signal transmission system according to the invention an input signal waveform to be transmitted by digital means is operated on to produce two or more phase displaced signal waveforms of similar power spectra. These phase displaced signal waveforms are individually quantized with respect to two or more amplitude levels to maintain the information contained in the phase displaced signal waveforms substantially independent. The resultant quantized signal waveforms are separately sampled, coded and transmitted by pulse modulation means. The transmitted signals on reception are separately decoded to yield corresponding phase displaced signal waveforms which are recombined into an approximation of the original signal waveform.

In order to obtain the phase displaced signal waveforms, the original signal waveform is applied to two or more phase shift networks having common inputs but distinct outputs, the networks being so designed that the power spectra of the output signal waveforms are alike and in relative phase displacement. The decoded signals are recombined through phase shift networks complementary to those used to produce the phase displaced signal waveforms.

While the phase displaced signal waveforms of a sine wave or other regular waveform can be produced in quadrature by the phase shift networks, the term "quadrature" cannot be properly applied to the corresponding signal waveforms of an arbitrary signal waveform, such as a speech waveform. It is in fact not possible to construct a network yielding output signals in exact quadrature over a continuous spectrum of frequencies. However, it has been found by experiment that a good approximation to quadrature over a frequency range customarily used in telephony is sufficient to confer the benefits of the invention in practice.

If a sine wave is quantized, the result contains all the odd harmonics. But if two quadrature waveforms of that sine wave are quantized and recombined in the manner described, the fundamental frequency components and the $(4n+1)$th harmonics add, while the $(4n-1)$th harmonics cancel. As stated above, the latter contain more than half the noise power, and the resultant noise may therefore be reduced by as much as 5 db (decibels).

Normally if an arbitrary band-limited signal be sampled at a rate not less than twice its highest frequency component, it can be reconstructed from the samples without ambiguity or undue noise. If two phase displaced signal waveforms are sampled according to the invention, the total number of samples need be no more. Each is sampled at half the normal rate, and the side bands which fall in the passband (thereby causing noise if one train of sample pulses alone be demodulated) are cancelled when the two demodulation products are recombined.

It is possible to improve the quality of a transmitted signal by increasing the sampling rate. By doubling the rate of sampling of one signal the noise can be reduced by as much as 3 db. However, by sampling the phase displaced signal waveforms at the normal rate (i.e. twice the band width) may reduce the noise by 5 db, as stated above.

The invention is complementary rather than alternative to the known methods of compression and pre-emphasis, and indeed they may be used in both phase displaced signal waveform channels, since the statistical properties of the signal waveforms are much the same.

It is apparent that an increase in the number of sampling levels will give an improvement in quality of the received signal. However, with coders similar to those now in use (i.e. not more than 256 levels) the phase displacement technique described gives a means of improving quality which is more immediately practicable than raising the number of sampling levels still further.

Another method of improving the signal where a low number of levels is used would be to add a further channel sending a volume-control signal at a syllabic rate. This would improve the naturalness of the speech and reduce the noise between syllables.

In practice the quantizing and coding would not use separate channels for the two phase displaced signal waveforms, but they would share the same channel in time division.

The invention is not limited to two out-of-phase signal waveforms. Any suitable number of such signal waveforms may be derived from the original signal waveform with each derived signal waveform being quantized and coded. Also, it would be possible in a high quality system to allot two channels for a system as described, but using the channels independently at periods of peak traffic with a corresponding sacrifice of quality.

Figure 2:
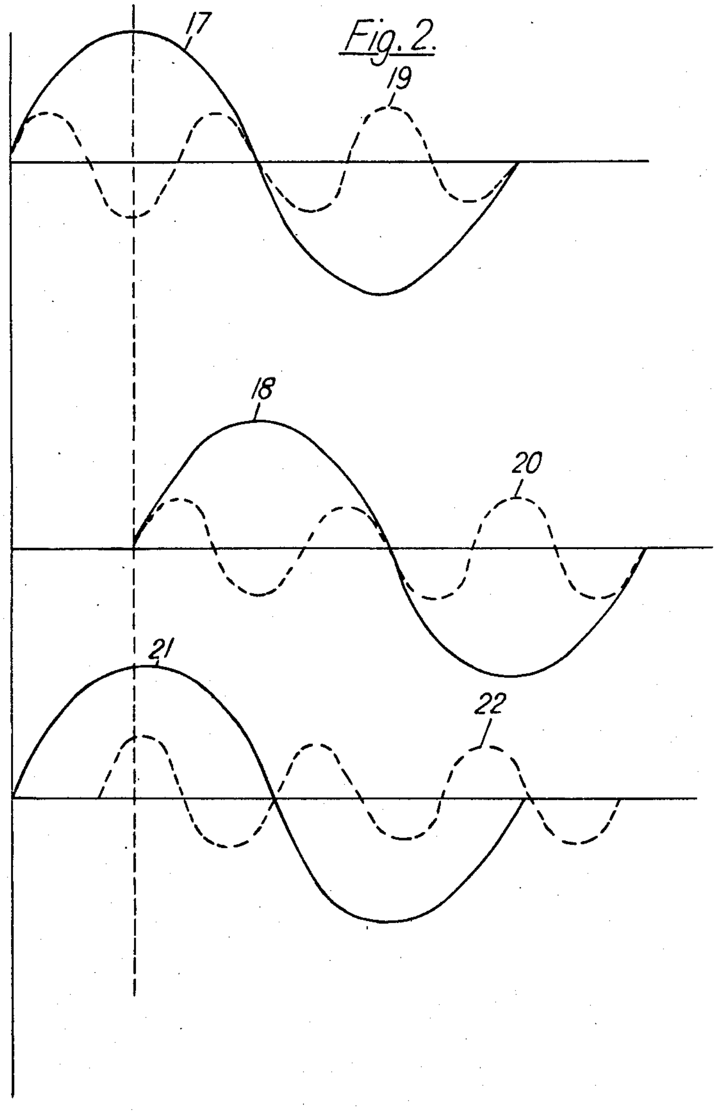

The above-mentioned and other features and objects of this invention will become more apparent by reference to the following description taken in conjunction with the accompanying drawings, in which:

FIG. 1 shows a block diagram of a system for transmission of a noise-free signal in accordance with the principles of this invention; and FIG. 2 shows a graphical representation of the signal waveforms and the relevant harmonics at various stages in the system of FIG. 1.

Referring to FIG. 1, a means 1 is coupled to a source of signal waveform 2 to produce a plurality of signal waveforms identical to the signal waveforms of source 2 but phase displaced with respect to each other. Means 1 likewise maintains the information contained in each of the phase displaced signal waveforms substantially independent. The phase displaced signal waveforms are each independently converted to a pulse signal in means 3. A means 4 is coupled to means 3 to translate the pulse signals to the phase displaced signal waveforms which are then operated upon by means 5 to recombine the phase displaced signal waveforms into an approximation of the signal waveform of source 2.

Referring to FIG. 1 in greater detail, the incoming signal waveform is passed through a filter 6, a pre-emphasis network 7 and is fed into a phase shift network 8. Two signal waveforms are derived from phase shift network 8 identical in magnitude and frequency to the original incoming signal waveform but phase displaced with respect to each other by 90 degrees. Each phase displaced signal waveform is then passed through its own independent transmission channel. Each transmission channel comprises a quantizer 9, a sampler, coder and transmitter 10, a transmission medium 11, such as a waveguiding or radio transmission medium, and a receiver decoder 12. The operation of the sampler and decoder of each transmission channel is dependent upon a basic frequency pulse generator 13. The decoded phase displaced signal waveforms are then recombined in a phase shift network 14 which is complementary to phase shift network 8 so that the original signal waveform is reconstructed. The reconstructed signal waveform then passes through the normal stages of de-emphasis in de-emphasis network 15 and filtering in filter 16.

It should be recalled that, as pointed out hereinabove, the coded signals of each phase displaced signal waveform may be transmitted over a common transmission medium by time division multiplex techniques rather than the independent transmission medium as illustrated. Proper timing of the signals from generator 13 to the sampler and coder of each transmission channel will enable the time division multiplexing of the coded signals.

Referring to FIG. 2, the curves 17 and 18 represent the two phase displaced signal waveforms produced by the phase shift network 8. It will be seen that these waveforms 17 and 18 are equal in magnitude and frequency but are 90 degrees out of phase with respect to each other. The curves 19 and 20 represent the $(4n-1)$th harmonics of the phase displaced signal waveforms 17 and 18, respectively. The curve 21 represents the phase displaced signal waveform 18 after it has passed through phase shift network 14 and has been synchronized with, or in other words, placed in phase coincidence with, the other phase displaced signal waveform 17 to reconstitute the original signal waveform. It will be noted that the phase displacement of the waveform 18 with respect to waveform 21 is 90 degrees and that the phase displacement of the harmonic 20 with respect to the $(4n-1)$th harmonic of curve 21 is also 90 degrees as shown by curve 22. Thus, phase displaced signal waveform 18 has been moved by 90 degrees relative to its original phasing and the harmonic 22 has moved 90 degrees relative to the harmonic 20 but not 90 degrees relative to the harmonic 19 of the original signal waveform 17. In effect, the harmonic 22 has been moved 180 degrees relative to harmonic 19 of signal waveform 17. Thus, it will be seen that recombination of the signal waveforms 17 and 21 will cause these signal waveforms to add while recombination of the harmonic waveforms 19 and 21 will cause these latter waveforms to cancel.

The operation of the transmission system of this invention has been demonstrated hereinabove with sine waves, but as has been explained above, a good approximation to the quadrature displacement of sine waves can be obtained over a frequency range customarily used in telephony.

While I have described above the principles of my invention in connection with specific apparatus, it is to be clearly understood that this description is made only by way of example and not as a limitation to the scope of my invention as set forth in the objects thereof and in the accompanying claims.

I claim:

1. A signal transmission system comprising a source of signal waveforms, means coupled to said source to produce a plurality of signal waveforms phase displaced with respect to each other, the information contained in each of said phase displaced signal waveforms being substantially independent, means coupled to said producing means to convert each of said phase displaced signal waveforms into a pulse signal, means coupled to said converting means to translate said pulse signals to said phase displaced signal waveforms, and means coupled to said translating means to recombine said phase displaced signal waveforms into an approximation of said signal waveforms.

2. A signal transmission system comprising a source of signal waveforms, means coupled to said source to produce a plurality of said signal waveforms phase displaced with respect to each other, the information contained in each of said phase displaced signal waveforms being substantially independent, means coupled to said producing means to convert each of said phase displaced signal waveforms into a pulse signal, means coupled to said converting means to transmit said pulse signals, means to receive said transmitted pulse signals, means coupled to said receiving means to translate said pulse signals to said phase displaced signal waveforms, and means coupled to said translating means to recombine said phase displaced signal waveforms into an approximation of said signal waveforms.

3. A signal transmission system comprising a source of signal waveforms, a phase shift network coupled to said source to produce a plurality of said signal waveforms phase displaced with respect to each other, means coupled to said phase shift network to maintain the information contained in each of said phase displaced signal waveforms substantially independent, means coupled to said maintaining means to convert each of said phase displaced signal waveforms into a pulse signal, means coupled to said converting means to transmit said pulse signals, means to receive said transmitted pulse signals, means coupled to said receiving means to translate said pulse signals to said phase displaced signal waveforms, and means coupled to said translating means to recombine said phase displaced signal waveforms into an approximation of said signal waveforms.

4. A signal transmission system comprising a source of signal waveforms, means coupled to said source to produce a plurality of said signal waveforms phase displaced with respect to each other, the information contained in each of said phase displaced signal waveforms being substantially independent, coding means coupled to said producing means to convert each of said phase displaced signal waveforms into digital pulse signals, means coupled to said coding means to transmit said pulse signals, means to receive said transmitted pulse signals, decoding means coupled to said receiving means to translate said pulse signals to said phase displaced signal waveforms, and means coupled to said decoding means to recombine said phase displaced signal waveforms into an approximation of said signal waveforms.

5. A signal transmission system comprising a source of signal waveforms, means coupled to said source to produce a plurality of said signal waveforms phase displaced with respect to each other, the information contained in each of said phase displaced signal waveforms being substantially independent, means coupled to said producing means to convert each of said phase displaced signal waveforms into a pulse signal, means coupled to said converting means to transmit said pulse signals, means to receive said transmitted pulse signals, means coupled to said receiving means to translate said pulse signals to said phase displaced signal waveforms, a phase shift network coupled to said translating means to dispose said phase displaced signal waveforms in phase coincidence, and means coupled to said phase shift network to combine said phase coincident signal waveforms into an approximation of said signal waveforms.

6. A signal transmission system comprising a source of signal waveforms, a phase shift network coupled to said source to produce a plurality of said signal waveforms phase displaced with respect to each other, means coupled to said phase shift network to maintain the information contained in each of said phase displaced signal waveforms substantially independent, coding means coupled to said maintaining means to convert each of said phase displaced signal waveforms into a digital pulse signal, means coupled to said coding means to transmit said pulse signals, means to receive said transmitted pulse signals, decoding means coupled to said receiving means to translate said pulse signals to said phase displaced signal waveforms, and means coupled to said decoding means to recombine said phase displaced signal waveforms into an approximation of said signal waveforms.

7. A signal transmission system comprising a source of signal waveforms, means coupled to said source to produce a plurality of said signal waveforms phase displaced with respect to each other, the information contained in each of said phase displaced signal waveforms being substantially independent, coding means coupled to said producing means to convert each of said phase displaced signal waveforms into a digital pulse signal, means coupled to said coding means to transmit said pulse signals, means to receive said transmitted pulse signals, decoding means coupled to said receiving means to translate said pulse signals to said phase displaced signal waveforms, a phase shift network coupled to said decoding means to dispose said phase displaced signal waveforms in phase coincidence, and means coupled to said phase shift network to combine the resultant phase coincident signal waveforms into an approximation of said signal waveforms.

8. A signal transmission system comprising a source of signal waveforms, a first phase shift network coupled to said source to produce a plurality of said signal waveforms phase displaced with respect to each other, means coupled to said first phase shift network to maintain the information contained in each of said phase displaced signal waveforms substantially independent, means coupled to said maintaining means to convert each of said phase displaced signal waveforms into a pulse signal, means coupled to said converting means to transmit said pulse signals, means to receive said transmitted pulse signals, means coupled to said receiving means to translate said pulse signals to said phase displaced signal waveforms, a second phase shift network complementary to said first phase shift network coupled to said translating means to dispose said phase displaced signal waveforms in phase coincidence, and means coupled to said second phase shift network to combine said phase coincident signal waveforms into an approximation of said signal waveforms.

9. A signal transmission system comprising a source of signal waveforms, a first phase shift network coupled to said source to produce a plurality of said signal waveforms phase displaced with respect to each other, means coupled to said phase shift network to maintain the information contained in each of said phase displaced signal waveforms substantially independent, coding means coupled to said maintaining means to convert each of said phase displaced signal waveforms into a digital pulse signal, means coupled to said coding means to transmit said pulse signals, means to receive said transmitted pulse signals, decoding means coupled to said receiving means to translate said pulse signals to said phase displaced signal waveforms, a second phase shift network complementary to said first phase shift network coupled to said translating means to dispose said phase displaced signal waveforms in phase coincidence, and means coupled to said second phase shift network to combine said phase coincident signal waveforms into an approximation of said signal waveforms.

10. A signal transmission system comprising a source of signal waveforms, means coupled to said source to produce a plurality of said signal waveforms phase displaced with respect to each other, means coupled to said producing means to quantize each of said phase displaced signal waveforms with respect to a plurality of amplitude levels, means coupled to each of said quantizing means to convert each of said quantized signal waveforms into a pulse signal, means coupled to said converting means to translate said pulse signals to said phase displaced signal waveforms, and means coupled to said translating means to recombine said phase displaced signal waveforms into an approximation of said signal waveforms.

11. A signal transmission system comprising a source of signal waveforms, means coupled to said source to produce a plurality of said signal waveforms phase displaced with respect to each other, means coupled to said producing means to quantize each of said phase displaced signal waveforms with respect to a plurality of amplitude levels, means coupled to said quantizing means to convert each of said quantized signal waveforms into a pulse signal, means coupled to said converting means to transmit said pulse signals, means to receive said transmitted pulse signals, means coupled to said receiving means to translate said pulse signals to said phase displaced signal waveforms, and means coupled to said translating means to recombine said phase displaced signal waveforms into an approximation of said signal waveforms.

12. A signal transmission system comprising a source of signal waveforms, a phase shift network having an input terminal coupled to said source and a plurality of output terminals to couple from said phase shift network a plurality of said signal waveforms, said signal waveforms on said output terminals being phase displaced with respect to each other, a plurality of quantizers each coupled to one of said output terminals to quantize each of said phase displaced signal waveforms with respect to a plurality of amplitude levels, means coupled to each of said quantizers to convert each of said quantized signal waveforms into a pulse signal, means coupled to said converting means to transmit said pulse signals, means to receive said transmitted pulse signals, means coupled to said receiving means to translate said pulse signals to said phase displaced signal waveforms, and means coupled to said translating means to recombine said phase displaced signal waveforms into an approximation of said signal waveforms.

13. A signal transmission system comprising a source of signal waveforms, means coupled to said source to produce a plurality of said signal waveforms phase displaced with respect to each other, means coupled to said producing means to quantize each of said phase displaced signal waveforms with respect to a plurality of amplitude levels, a coder coupled to said quantizing means to convert each of said quantized signal waveforms into a digital pulse signal, means coupled to said coder to transmit said pulse signals, means to receive said transmitted pulse signals, a decoder coupled to said receiving means to translate said pulse signals to said phase displaced signal waveforms, and means coupled to said decoder to recombine said phase displaced signal waveforms into an approximation of said signal waveforms.

14. A signal transmission system comprising a source of signal waveforms, means coupled to said source to produce a plurality of said signal wavforms phase displaced with respect to each other, means coupled to said producing means to quantize each of said phase displaced signal waveforms with respect to a plurality of amplitude levels, means coupled to said quantizing means to convert each of said quantized signal waveforms into a pulse signal, means coupled to said converting means to transmit said pulse signals, means to receive said transmitted pulse signals, means coupled to said receiving means to translate said pulse signals to said phase displaced signal waveforms, a phase shift network coupled to said translating means to dispose said phase displaced signal waveforms in phase coincidence, and means coupled to said phase shift network to combine said phase coincident signal waveforms into an approximation of said signal waveforms.

15. A signal transmission system comprising a source of signal waveforms, a phase shift network having an input terminal coupled to said source and a plurality of output terminals to couple from said phase shift network a plurality of said signal waveforms, said signal waveforms on said output terminals being phase displaced with respect to each other, a plurality of quantizers each coupled to one of said output terminals to quantize each of said phase displaced signal waveforms with respect to a plurality of amplitude levels, a plurality of coders each coupled to an associated one of said quantizers to convert each of said quantized signal waveforms into a digital pulse signal, means coupled to each of said coders to transmit said pulse signals, means to receive said transmitted pulse signals, a plurality of decoders coupled to said receiving means to translate said pulse signals to said phase displaced signal waveforms, and means coupled to each of said decoders to rceombine said phase displaced signal waveforms into an approximation of said signal waveforms.

16. A signal transmission system comprising a source of signal waveforms, means coupled to said source to produce a plurality of said signal waveforms phase displaced with respect to each other, means coupled to said producing means to quantize each of said phase displaced signal waveforms with respect to a plurality of amplitude levels, a plurality of coders coupled to said quantizing means each converting an associated one of said quantized signal waveforms into a digital pulse signal, means coupled to each of said coders to transmit said pulse signals, means to receive said transmitted pulse signals, a plurality of decoders coupled to said receiving means to translate said pulse signals to said phase displaced signal waveforms, a phase shift network coupled to each of said decoders to dispose said phase displaced signal waveforms in phase coincidence, and means coupled to said phase shift network to combine said phase coincident signal waveforms into an approximation of said signal waveforms.

17. A signal transmission system comprising a source of signal waveforms, a first phase shift network having an input terminal coupled to said source and a plurality of output terminals to couple from said first phase shift network a plurality of said signal waveforms, said signal waveforms on said output terminals being phase displaced with respect to each other, a plurality of quantizers each coupled to one of said output terminals to quantize each of said phase displaced signal waveforms with respect to a plurality of amplitude levels, means coupled to each of said quantizers to convert each of said quantized signal waveforms into a pulse signal, means coupled to said converting means to transmit said pulse signals, means to receive said transmitted pulse signals, means coupled to said receiving means to translate said pulse signals to said phase displaced signal waveforms, a second phase shift network complementary to said first phase shift network coupled to said translating means to dispose said phase displaced signal waveforms in phase coincidence, and means coupled to said second phase shift network to combine said phase coincident signal waveforms into an approximation of said signal waveforms.

18. A signal transmisison system comprising a source of signal waveforms, a first phase shift network having an input terminal coupled to said source and a plurality of output terminals to couple from said first phase shift network a plurality of said signal waveforms, said signal waveforms on said output terminals being phase displaced with respect to each other, a plurality of quantizers each coupled to one of said output terminals to quantize each of said phase displaced signal waveforms with respect to a plurality of amplitude levels, a plurality of coders each coupled to an associated one of said quantizers to convert each of said quantized signal waveforms into a digital pulse signal, means coupled to each of said coders to transmit said pulse signals, means to receive said transmitted pulse signals, a plurality of decoders coupled to said receiving means to translate said pulse signals to said phase displaced signal waveforms, a second phase shift network complementary to said first phase shift network coupled to each of said decoders to dispose said phase displaced signal waveforms in phase coincidence, and means coupled to said second phase shift network to combine said phase coincident signal waveforms into an approximation of said signal waveforms.

19. A signal transmission system comprising a source of signal waveforms, means coupled to said source to produce two of said signal waveforms phase displaced in substantially a quadrature relationship with respect to each other, means coupled to said producing means to quantize each of said phase displaced signal waveforms with respect to a plurality of amplitude levels, means coupled to said quantizing means to convert each of said quantized signal waveforms into a pulse signal, means coupled to said converting means to transmit said pulse signals, means to receive said transmitted pulse signals, means coupled to said receiving means to translate said pulse signals to said phase displaced signal waveforms, and means coupled to said translating means to recombine said phase displaced signal waveforms into an approximation of said signal waveforms.

20. A signal transmission system comprising a source of signal waveforms, means coupled to said source to produce two of said signal waveforms phase displaced in substantially a quadrature relationship with respect to each other, a pair of transmission channels coupled to said producing means, each of said transmission channels including means to quantize said phase displaced signal waveform with respect to a plurality of amplitude levels, means coupled to said quantizing means to convert said quantized signal waveform into a pulse signal, means coupled to said converting means to transmit said pulse signal, means to receive said transmitted pulse signal, and means coupled to said receiving means to translate said pulse signal to said phase displaced signal waveform, and means coupled in common to said translating means of each of said transmission channels to recombine said phase displaced signal waveforms into an approximation of said signal waveforms.

References Cited in the file of this patent

UNITED STATES PATENTS 2,902,542 Treadwell ______________ Sept. 1, 1959